April 28, 1959     T. O. KOSATKA     2,884,267
FACE TYPE SEALING DEVICE
Filed Nov. 7, 1956     2 Sheets-Sheet 1
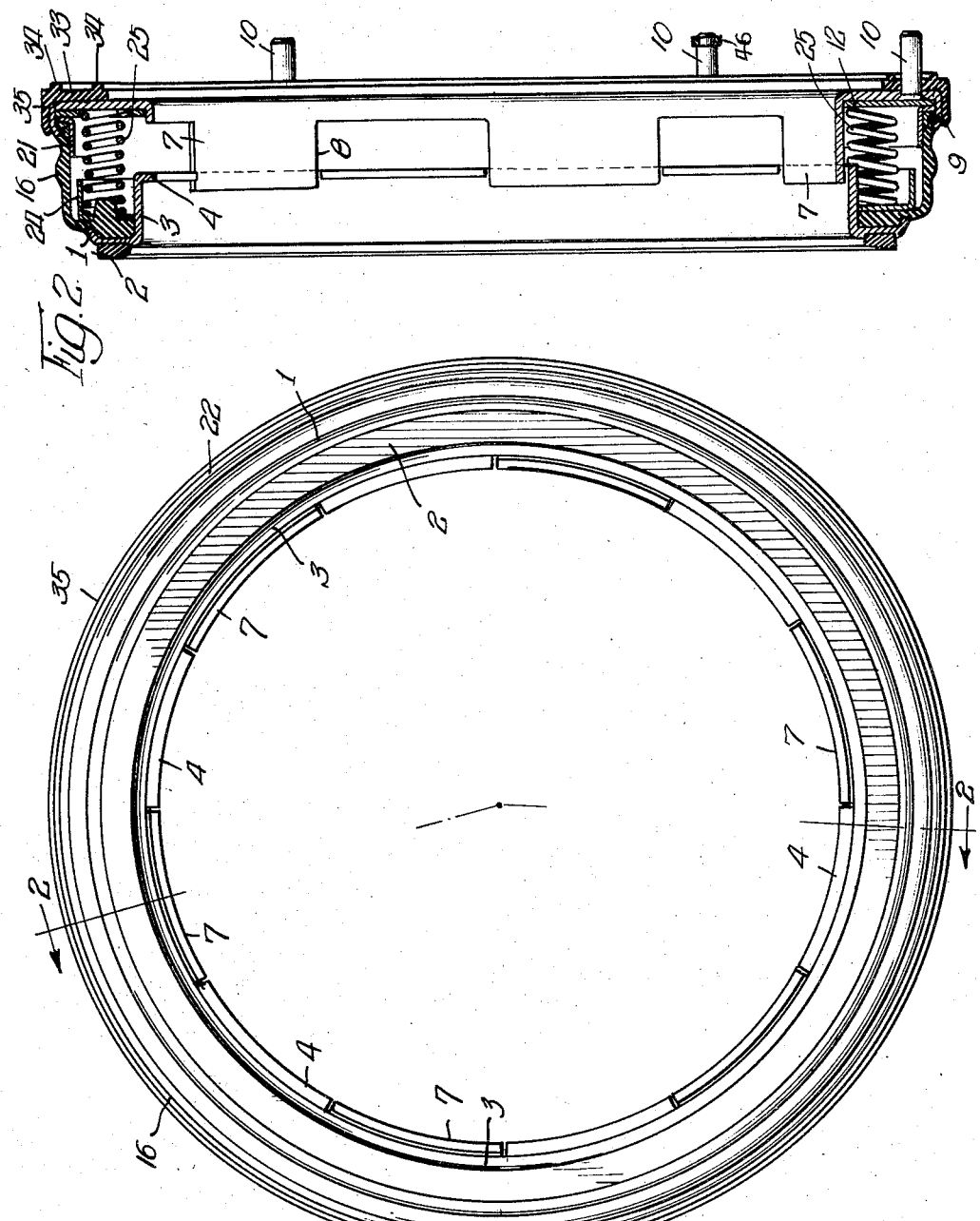
INVENTOR.
Thomas O. Kosatka,
BY
George H. Simmons
Atty.

April 28, 1959  T. O. KOSATKA  2,884,267
FACE TYPE SEALING DEVICE
Filed Nov. 7, 1956  2 Sheets-Sheet 2

INVENTOR.
Thomas O. Kosatka,
BY George H. Simmons
Atty.

United States Patent Office 2,884,267
Patented Apr. 28, 1959

2,884,267

FACE TYPE SEALING DEVICE

Thomas O. Kosatka, Chicago, Ill., assignor to Victor Manufacturing & Gasket Co., Chicago, Ill., a corporation of Illinois Application November 7, 1956, Serial No. 620,853

15 Claims. (Cl. 286—11)

This invention relates to heavy duty face type sealing devices and has for its principal object the provision of a new and improved device of this type.

It is a main object of the invention to provide a face type seal for use in heavy duty installations such as, for example, the main drives of track-laying type tractors to prevent the loss of lubricants from and the entry of dirt into the bearings and gear box of the machine.

Another object of the invention is to provide a heavy duty face type seal in which the metallic parts that mount the device in a machine part and that support the sealing ring in the device are composed of steel plate drawn and formed to required shape and coated with suitable rust preventatives such as plating with a non-corrosive material.

Another object of the invention is to provide a heavy duty sealing device that is rugged and able to withstand the hard usage to which devices of this kind are subjected thereby to insure long life of the device.

Another object of the invention is to provide a heavy duty face type seal in which an elastomer bellows is bonded to a front metallic part of the device and is secured to a rear metallic part of the device by clamping and in which the elastomer includes lugs which space and secure coil springs in the device.

Another object of the invention is to provide in a face type seal having an elastomer bellows and springs for tensioning the device, a guard for preventing the bellows from engaging the springs during operation of the device.

Further objects of the invention not specifically mentioned here will be apparent from the detailed description and claims which follow, reference being had to the accompanying drawings in which a preferred embodiment of the invention is shown by way of example and in which:

Fig. 1 is a plan view of the sealing device as seen from the front or sealing ring side;

Fig. 2 is a cross sectional view taken substantially along the lines 2—2 of Fig. 1, looking in the direction of the arrows;

Figure 3:
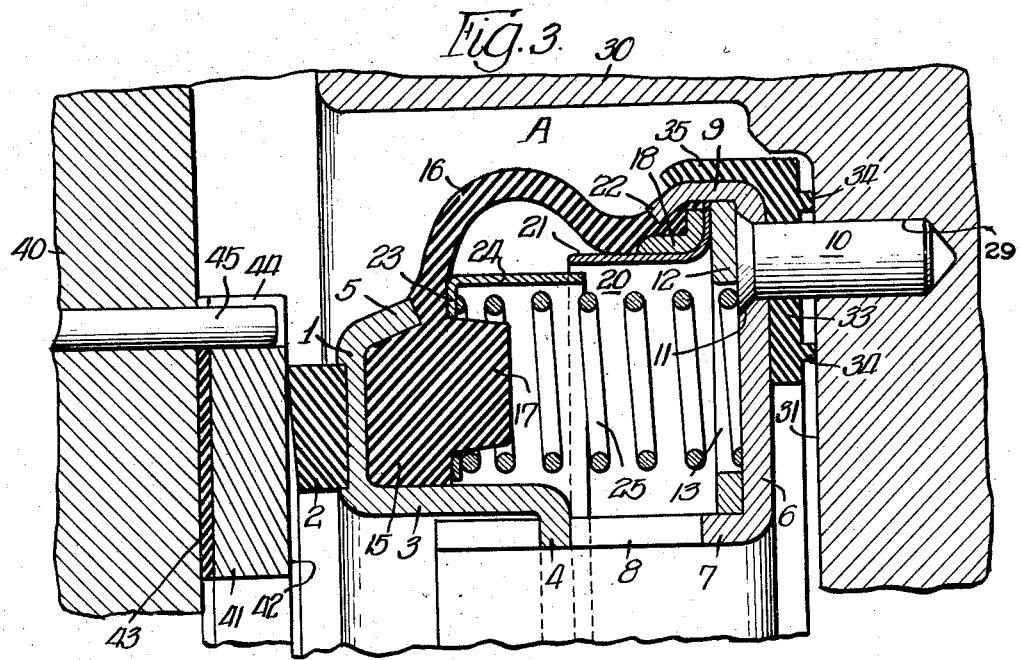
Fig. 3 is a fragmentary cross sectional view drawn to an enlarged scale and showing the environment in which the device is installed, with the sealing device in normal operating position.

The sealing device of the present invention is designed to be mounted in a stationary machine part and the sealing ring thereof mated with a mating ring that is carried upon a rotatable part to form a fluid tight seal between the stationary and rotatable parts. The sealing device of the present invention is particularly adaptable for use in track-laying tractors commonly referred to as "cats." In such machines power is applied to the tracks through a bull gear that is driven by the main drive shaft of the vehicle. Tractors of this type are commonly used on construction projects and consequently are subjected to adverse conditions of dust and mud which must be kept out of the gear box and bearings to prevent damage thereto. Although tractors of this type are provided with shields that prevent gravel, stones, and other large objects from coming into contact with the seals, nevertheless finely comminuted materials, such as sand and dust, work their way past these shields and into contact with the seals which must function to prevent entry of such materials into the gear box and bearings of the machine.

In its preferred form, the seal of the present invention consists of a front metallic member, to the front face of which is fixed a sealing ring composed of material having a low coefficient of friction. Bonded to the rear face of this front metallic member is an elastomer bellows that extends rearwardly and is engaged with and fixed to a rear metallic member. This rear metallic member contains a plurality of pins that project into sockets in the stationary member to position the seal with respect thereto and to prevent rotation of the seal with respect to this stationary member. Projecting rearwardly from the inner edge of the annular front face of the front member is a cylindrical wall at the rear end of which an interrupted flange projects inwardly. Projecting forwardly from the back wall of the rear member is a cylindrical wall that telescopes inside of the cylindrical wall of the front member, and the rear cylindrical wall contains a plurality of slots into which the flange sections on the front cylindrical wall fit to prevent rotation of the front wall member with respect to the rear member; and since the flanges project into slots, axial movement of the members toward and away from each other is possible.

Preferably the flanges on the front cylindrical wall and the portions of the rear cylindrical wall intervening are of approximately the same width circumferentially of the walls; that is to say, in one instance for example, six flanges are provided on the front cylindrical wall and six grooves are provided in the rear cylindrical wall, with each flange and groove comprising approximately one-sixth (⅙) of the circumference of the walls.

Projecting rearwardly from that portion of the bellows bonded to the front member are a plurality of bosses uniformly spaced around the circumference of the member and a coil spring encircles each boss. The back member contains sockets into which the springs project to position same with respect to that member.

It may sometimes happen that in the operation of a tractor of the type to which the seal of the present invention may be applied, finely comminuted material or mud may build up in the space immediately surrounding the rubber bellows, and if provisions were not made to prevent it, such an accumulation of material might force the bellows into engagement with the springs, with the result that the bellows would be damaged and failure of the sealing device accelerated thereby. To guard against a contingency of this kind, I have provided a front guard consisting of an annulus of metal having perforations through which the elastomer bosses project. Extending rearwardly from the outer edge of this annulus is a cylindrical wall. Projecting forwardly from the rear member is a second cylindrical wall which telescopes with the cylindrical wall on the front member when the sealing device is compressed to normal operating position. Preferably, though not necessarily, the rear cylindrical wall fits outside of the front cylindrical wall. Thus there is formed between the springs and the bellows a metallic wall which definitely prevents engagement of the bellows with the springs.

The invention will be best understood by reference to the accompanying drawings from which it will be seen that the front member consists of an annulus 1 in the forwardly facing groove on the front face of which a sealing ring 2 is fixed. It will be noted that the front face of the sealing ring 2 tapers slightly to maximum ring thickness at the outer periphery of the ring. Extending rearwardly from the inner edge of the annulus 1 is a front cylindrical wall 3, from the rear end of which a plurality of flange segments 4 project inwardly. Preferably the front cylindrical wall 3 is provided with six flange segments 4, all of which are of uniform length circumferentially of the cylindrical wall; however, the number of flanges 4 may be increased or decreased within the teachings of the invention.

Projecting outwardly and rearwardly from the outer edge of the front annulus 1 is an outer wall 5 that forms an obtuse angle with the rear face of the annulus 1. In the embodiment shown by way of example, the angle between the rear face of annulus 1 and inner face of wall 5 is less than 115°. The junction between the annulus 1 and outer wall 5 is located as close to the outer edge of the sealing ring as possible.

The rear member of the sealing device consists of a rear annular wall 6, from the inner edge of which a wall 7 projects, this wall 7 having grooves or slots 8 which shape the wall as an interrupted or slotted cylinder. Flanges 4 project into the slots 8. Extending forwardly from the outer edge of the rear wall 6 is a clamping flange 9. Fixed in the rear wall 6 and projecting rearwardly therefrom are a plurality of pins 10 that are secured in the wall 6 in such a manner as to form a fluid tight joint 11 therewith. Within the teachings of the invention this fluid tight joint may be formed by welding, brazing, or any other suitable process.

Abutted against the front face of the rear wall 6 and extending thereacross into engagement with the wall 7 and clamping flange 9 is a washer 12 that contains a plurality of circular perforations 13 for a purpose presently to appear. The washer 12 is securely fixed to the wall 6 and over the pins 10, preferably by spot welding.

Preferably the front metallic member, the rear metallic member, and the washer 12 are formed from mild steel which may be plated or otherwise treated to prevent rusting. It will be noted that the washer 12 is of lighter gauge metal than the front and rear metallic members. When made as shown in the drawings, the device is strong enough to withstand the hard usage to which it is subjected and is not unduly heavy even in the larger sizes required.

Bonded to the rear face of the front annulus 1, the front portion of the inner surface of the front cylinder 3, and the inner face and outer end of the outer wall 5, is the base portion 15 of an elastomer bellows 16. Projecting rearwardly from the base portion 15 of the bellows are a plurality of cylindrical bosses 17, each of which is aligned axially with one of the perforations 13 in the washer 12. The bellows 16 extends rearwardly and at its rear end is bonded to a flanged ring 18.

Fitted against the front face of the washer 12 at the outer periphery thereof and against the inner and rear faces of the flanged washer 18 is a rear guard 20 that includes a cylindrical portion 21 that extends forwardly. As is clearly shown in the drawing, the forward edge 22 of the clamping ring 9 is formed inwardly to clamp the rear end of the bellows to the rear member and to secure the rear guard 20 in place therein.

Fitted against the rear face of the portion 15 of the bellows is a front guard having an annulus 23 that contains perforations through which the bosses 17 project. Extending rearwardly from this annulus 23 is a cylindrical section 24 which telescopes within the cylindrical section 21 of the rear guard, in the embodiment shown by way of example, when the seal is in its normal operating position.

The front and rear guards are both formed out of sheet metal, preferably steel, of lighter gauge than the front and rear members 1 and 6. When steel is preferred, these guards may be formed from a non-corrosive material such as brass, if desired. When composed of steel, protection against rusting by usual means is desirable.

Interposed between the annulus 23 and back wall 6 are a plurality of coil springs 25, the front ends of which surround a boss 17 and the rear ends of which are fitted in the perforations 13 in the washer 12. Preferably the springs 25 are spaced uniformly around the device, and the number of springs and load characteristics thereof will depend upon the pressures to be applied to the seal ring 2 during operation of the seal. In one instance, for example, fifteen (15) coil springs are employed and these are distributed uniformly around the device.

At their forward ends springs 25 bear against annulus 32 which distributes the pressure of the springs uniformly to the front member annulus 1. Annulus 32 also prevents springs 25 from digging into the elastomer against which it bears.

The sealing device thus described is inserted in a cavity A in a stationary machine member 30, which cavity is closed at its rear end by a radial wall 31 containing a plurality of sockets 29 into which the pins 10 are projected. To form a fluid tight seal between the rear member of the sealing device and the wall 31, an elastomer gasket 33 is provided. This gasket contains perforations through which the pins 10 project and contains rearwardly extending ribs 34 shown to be two in number, which aid in the formation of a fluid tight seal with the member 30. Projecting forwardly from the outer edge of the gasket 33 is an outer cylindrical wall 35 that is stretched over the clamping flange 9 to secure the washer on the sealing device.

Mounted upon the rotating member 40 of the machine is a mating plate 41 having a smooth outer face 42 engaged by the sealing ring 2 to form a fluid tight joint therebetween. A gasket 43 interposed between the plate 42 and hub of the movable member 40 forms a fluid tight seal between these members. The outer edge of the mating plate 41 contains a plurality of outwardly opening U-shaped sockets 44, into which are projected pins 45 that establish a driving connection between the rotatable member 40 and the mating plate 41.

As shown in Fig. 3, when the sealing device of the present invention is in its normal operating position, the bellows 16 bows outwardly into the cavity A surrounding the seal. Should this cavity A become filled with finely comminuted material or mud, the bowing of the bellows will be modified by this material. Since the outer wall 5 of the front metallic member slopes rearwardly and outwardly, there is no possibility of the material in the cavity A building up sufficiently to force the sealing ring 2 out of engagement with the mating plate 41 and against the tension of springs 25, which could happen if the wall 5 was parallel to the mating plate 41. Should the material in cavity A build up sufficiently to force the bellows 16 inwardly from the position shown in Fig. 3, the bellows will be pressed against the cylindrical guard walls 21 and 24 which prevent engagement of the bellows with the springs. Obviously, if the bellows were forced between adjacent convolutions of the springs and the seal then further compressed, the bellows would be pinched and deteriorated at a rapid rate and such deterioration is prevented by the front and rear guards.

Figure 4:
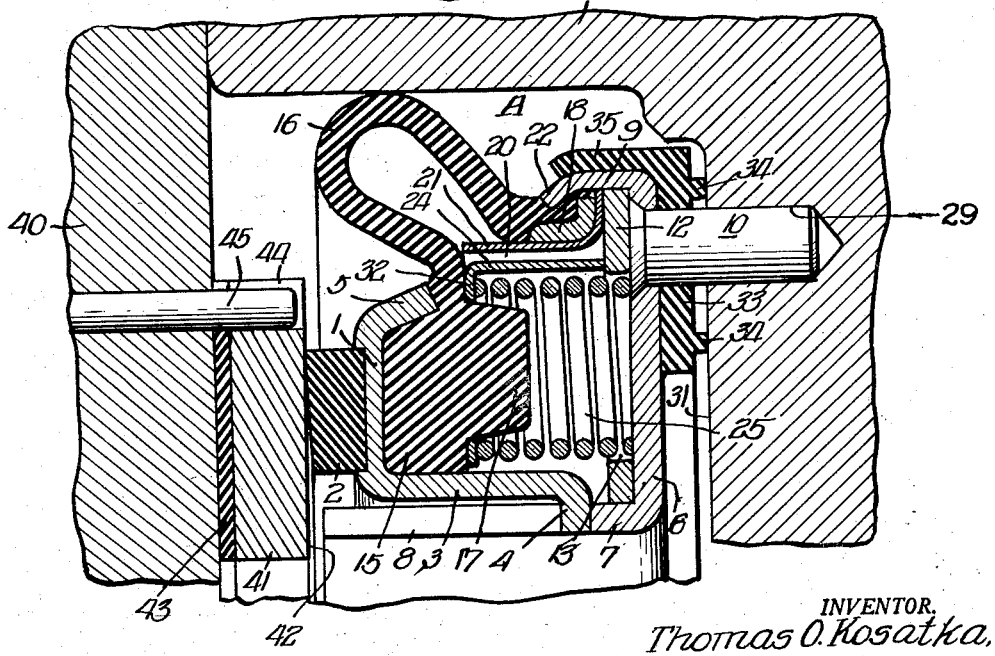
Fig. 4 is a view similar to Fig. 3, showing the sealing device compressed to its minimum thickness.

Should the sealing device be compressed to the minimum thickness at which it can function, the parts will be in the position shown in Fig. 4. It will be noted that the flanges 4 now abut against the bottoms of the grooves 8 in which they are positioned, and that the rear end of the cylindrical flange 24 of the front guard abuts against the washer 12 in the rear member. Further compression of the sealing device is thus definitely prevented. It will be noted that in this position adjacent convolutions of the springs 25 are still spaced slightly apart so that damage to the spring is prevented. It will also be noted that the bellows 16 bulges outwardly and engages the wall of member 30 that defines the outer limit of the cavity A; however, since both the bellows 16 and the member 30 are stationary, no damage to the bellows will result.

As will be seen in Fig. 2, one of the pins 10 contains a groove in which is fitted an elastomer washer 46 that will form a seal with the bore into which the pin is inserted. In one example, six pins 10 were employed and alternate ones of these pins were equipped with washers such as 46. The number of pins employed and the number of such pins equipped with washers may both be varied within the teachings of the invention.

The sealing device of the present invention is preferably formed of steel stampings that comprise the front and rear members of the device. Suitable protective coatings are preferably applied to these stampings to prevent rusting of the same under the adverse conditions to be met by the seal. The elastomer of which the bellows 16 is composed is, of course, one that is impervious to oils, greases and the like, with which it is to come into contact in service, and is sufficiently tough to stand up well against the finely comminuted material with which it comes into contact. The sealing rings 2 may be composed of any suitable material within the teachings of the invention. So long as the material has a low coefficient of friction with the material in mating plate 41, the conditions of the invention are met. As is customary, mating plate 41 is preferably composed of hardened steel, the sealing face of which plate is finished to a high degree of smoothness thereby to permit the formation of a fluid tight seal with the sealing ring.

The sealing device of the present invention, in its preferred form, is rugged and fully capable of withstanding the hard usage to which it will be put in track-laying tractors in service. While specifically designed for such an application, the device may also be put to other uses within the teachings of the invention. In service in a track-laying tractor, two sealing devices will be used in connection with each of the bull gears by which the tracks are driven, only one of these devices being shown in the drawings to avoid an unnecessary complication thereof.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

I claim:

1. A sealing device comprising: a front metal member; a seal ring fixed upon the front face of said member; an elastomer bellows bonded to the rear face of said member and extending rearwardly therefrom; a rear metal member to the outer edge of which said bellows is fixed; interengaged means on said front and rear members for preventing relative rotation therebetween; pins fixed to said rear member and projecting rearwardly therefrom for positioning the device with respect to a machine part; spring means interposed between said front and rear member for urging the same apart; a front guard carried by the portion of said elastomer bellows bonded to the rear face of said front member, said front guard extending rearwardly toward said rear member; and a rear guard carried by said rear member and extending forwardly therefrom in telescoping relation to said front guard.

2. A device as specified in claim 1, in which the front member comprises a front annulus to the front face of which the seal ring is fixed, a cylindrical wall extending rearwardly from the inner edge of said annulus, and an outer wall extending outwardly and rearwardly from the outer edge of the annulus and in which the elastomer is bonded to the rear face of the annulus, the outer face of the cylindrical wall and the inner face and rear edge of the outer wall.

3. A device as specified in claim 2, in which the outer wall extends rearwardly from the outer edge of the seal ring and forms an angle of not more than 115° with the rear face of the annulus.

4. A device as specified in claim 2, in which the rear member includes a rear annular wall, an interrupted cylindrical wall extending forwardly from the inner edge of said rear wall and a clamping flange extending forwardly from the outer edge of said rear wall.

5. A device as specified in claim 4, in which the means preventing relative rotation between front and rear members comprises: an interrupted flange extending inwardly from the rear end of the cylindrical wall of the front member and extending between the sections of the interrupted cylindrical wall on the back member, said means permitting axial movement between the members.

6. A device as specified in claim 5, in which the front and back members are made from rolled steel plates.

7. A device as specified in claim 5, in which a washer is disposed against the front face of the rear wall and extends between the interrupted cylindrical wall and the clamping flange and contains a plurality of circular perforations by which the spring means is positioned relative to the rear wall.

8. A device as specified in claim 7, in which the pins are fixed fluid tight in the rear wall and abut against the rear face of the washer and in which the washer is fixed in the member.

9. A device as specified in claim 8, in which an elastomer gasket that engages the rear face of the rear wall contains perforations through which the pins project, which gasket includes an integral outer cylindrical wall that is stretched over the clamping flange to secure the gasket upon the rear member.

10. A device as specified in claim 7, in which the portion of the elastomer bellows bonded to the rear face of the front annulus contains lugs and the spring means comprises a plurality of coil springs into each of which a lug projects to position the spring with respect to the front member.

11. A device as specified in claim 10, in which the front guard comprises an annulas having perforations through which the lugs project and a cylindrical wall projecting rearwardly from the outer edge of the annulus and disposed between the springs and the bellows and in which the springs bear against the annulus which distributes the force thereof uniformly on the elastomer.

12. A device as specified in claim 11, in which the elastomer bellows is bonded at its rear end to a flanged ring and in which the clamping flange clamps the elastomer against that ring to secure the bellows to the rear member.

13. A device as specified in claim 12, in which the rear guard comprises an annular portion clamped between the flanged ring and the washer and a cylindrical portion extending forwardly from the inner edge of the annular portion, which cylindrical portion is disposed alongside the cylindrical wall of the front guard.

14. A device as specified in claim 13, in which the interrupted cylindrical wall on the rear member includes a continuous portion adjacent the rear wall against which the interrupted flange sections of the front member abut when the front member is moved towards the back member sufficiently to fully compress the coil springs and in which the cylindrical wall of the front guard is of sufficient length axially of the device to engage the washer on the rear wall simultaneously with the engagement of the interrupted flange sections with said continuous portion.

15. A sealing device comprising: a front annulus; a cylindrical wall extending rearwardly from the inner edge of said annulus; an interrupted flange extending inwardly from the rear end of said wall; a shorter wall extending rearwardly and outwardly from the outer edge of said annulus; a seal ring fixed upon the forward face of said annulus; an elastomer bellows bonded to the rear face of said annulus, the outer face of said cylindrical wall and to the inner and rear faces of said shorter wall, which bellows extends rearwardly from said shorter wall; a flanged metal ring at the rear end of said bellows to which the bellows is bonded; a rear guard engaging the rear and inner faces of said flanged metal ring and extending forwardly therefrom along the inner face of the bellows; a rear planar annular wall; an interrupted cylindrical wall extending forwardly from the inner edge of said rear wall and between adjacent sections of the interrupted flange on the front cylindrical wall; a plurality of pins uniformly spaced around said rear wall and extending rearwardly therefrom; a washer disposed against the front face of said rear wall and having a plurality of perforations; a clamping flange at the outer edge of said rear wall extending over said flanged ring and bellows to secure the device together as a unit; a plurality of bosses integral with said elastomer extending rearwardly from the portion thereof that engages said front annulus, with each boss aligned with a perforation in said washer; a front guard comprising a perforated annulus through the perforations of which said bosses extend, and a cylindrical wall extending rearwardly from the outer edge of said latter annulus and telescoping with said rear guard; and a plurality of coil springs each surrounding one of said bosses and extending rearwardly therefrom through a perforation in said washer into engagement with said rear wall, said springs urging said seal ring forwardly of the device.

References Cited in the file of this patent
UNITED STATES PATENTS

| | | |
|---|---|---|
| 1,886,147 | Baker et al. | Nov. 1, 1932 |
| 2,301,723 | Vedovell | Nov. 10, 1942 |
| 2,444,699 | Hastings et al. | July 6, 1948 |
| 2,478,067 | Vedovell | Aug. 2, 1949 |
| 2,765,186 | Wright | Oct. 2, 1956 |

FOREIGN PATENTS

| | | |
|---|---|---|
| 676,086 | Great Britain | July 23, 1952 |

UNITED STATES PATENT OFFICE
CERTIFICATE OF CORRECTION

April 28, 1959

Patent No. 2,884,267     Thomas O. Kosatka

It is hereby certified that error appears in the printed specification of the above numbered patent requiring correction and that the said Letters Patent should read as corrected below.

Column 3, line 75, for "When" read -- While --; column 6, line 48, for "and to" read -- end to --.

Signed and sealed this 18th day of August 1959.

(SEAL)
Attest:

KARL H. AXLINE
Attesting Officer

ROBERT C. WATSON
Commissioner of Patents